(12) United States Patent
Xu et al.

(10) Patent No.: US 12,444,759 B1
(45) Date of Patent: Oct. 14, 2025

(54) ULTRA-HIGH STABILITY PHENAZINE-BASED ELECTROLYTE FOR ALKALINE AQUEOUS ORGANIC REDOX FLOW BATTERY (AORFB), AND FLOW BATTERY

(71) Applicant: Suzhou Laboratory, Jiangsu (CN)

(72) Inventors: Zhi Xu, Jiangsu (CN); Jie Wei, Jiangsu (CN); Kang Huang, Jiangsu (CN); Yixing Wang, Jiangsu (CN)

(73) Assignee: Suzhou Laboratory, Suzhou (CN)

( * ) Notice: Subject to any disclaimer, the term of this patent is extended or adjusted under 35 U.S.C. 154(b) by 0 days.

(21) Appl. No.: 19/217,289

(22) Filed: May 23, 2025

(30) Foreign Application Priority Data

Sep. 25, 2024 (CN) .......................... 202411339152.4

(51) Int. Cl.
*H01M 8/04186* (2016.01)
*H01M 8/083* (2016.01)
*H01M 8/18* (2006.01)

(52) U.S. Cl.
CPC ....... *H01M 8/04186* (2013.01); *H01M 8/083* (2013.01); *H01M 8/188* (2013.01)

(58) Field of Classification Search
CPC ... H01M 8/04186; H01M 8/083; H01M 8/188
See application file for complete search history.

(56) References Cited

FOREIGN PATENT DOCUMENTS

| CN | 110212203 A | 9/2019 |
|---|---|---|
| CN | 115084524 A | 9/2022 |

OTHER PUBLICATIONS

Chen et al. "Organic Electrolytes for pH-Neutral Aqueous Organic Redox Flow Batteries" Adv. Funct. Mater. 2022, 32, 2108777.*
Liu et al. "Redox-Modulated Host-Guest Complex Realizing Stable TwoElectron Storage Viologen for Flow Battery" Ind. Eng. Chem. Res. 2022, 61, 14508-14514.*
First Office Action cited in CN202411339152.4, mailed Nov. 6, 2024, 10 pages.
Notice of Grant cited in CN202411339152.4, mailed Jan. 3, 2025, 3 pages.

(Continued)

*Primary Examiner* — Olatunji A Godo
(74) *Attorney, Agent, or Firm* — Cooper Legal Group, LLC

(57) ABSTRACT

The present disclosure provides an ultra-high stability phenazine-based electrolyte for an alkaline aqueous organic redox flow battery (AORFB), and a flow battery, and belongs to the technical field of electrochemical energy storage. The electrolyte includes a cyclic supramolecule with a rigid polyhydroxy conical cavity structure that is hydrophobic internally and hydrophilic externally, a phenazine-based organic compound, and an alkaline aqueous solution. The cyclic supramolecule is a cyclodextrin or a derivative thereof. The cyclodextrin or the derivative thereof can improve the reaction kinetics of the phenazine-based organic compound and enhance the utilization and stability. The electrolyte has the advantages of easy availability of raw materials, easy operations, and low cost, and can be used to produce alkaline AORFBs with small polarization, high capacity utilization efficiency, prominent rate performance, high energy efficiency, and excellent stability.

12 Claims, 11 Drawing Sheets

(56) References Cited

OTHER PUBLICATIONS

Park, J., Lee, Y., Yun, D. et al. "A benzo[a]phenazine-based redox species with highly reversible two-electron reaction for aqueous organic redox flow batteries". Electrochim. Acta, 2023,439, 141644.
Liu, Y., Zhang P., Wu Z. et al. "Screening Ultra-Stable (Phenazine)dioxyalkanocic Acids with Varied Water-Solubilizing Chain Lengths for High-Capacity Aqueous Redox Flow Batteries" J. Am. Chem. Soc., 2024, 146, 3293-3302.
Pang, S., Wang, X., Wang, P. et al. "Biomimetic Amino Acid Functionalized Phenazine Flow Batteries with Long Lifetime at Near-Neutral pH" Angew. Chem. Int. Ed. 2021, 60, 5289-5298.
Hollas, A., Wei, X., Murugesan, V. et al. "A biomimetic high-capacity phenazine-based anolyte for aqueous organic redox flow batteries". Nat Energy, 2018, 3, 508-514.

* cited by examiner

ULTRA-HIGH STABILITY PHENAZINE-BASED ELECTROLYTE FOR ALKALINE AQUEOUS ORGANIC REDOX FLOW BATTERY (AORFB), AND FLOW BATTERY

CROSS REFERENCE TO THE RELATED APPLICATIONS

This application is based upon and claims priority to Chinese Patent Application No. 202411339152.4, filed on Sep. 25, 2024, the entire contents of which are incorporated herein by reference.

TECHNICAL FIELD

The present disclosure relates to an ultra-high stability phenazine-based electrolyte for an alkaline aqueous organic redox flow battery (AORFB), and a flow battery, and belongs to the technical field of electrochemical energy storage.

BACKGROUND

With the continuous development of human society and economy, the supply of fossil fuels is gradually diminishing, resulting in an increasingly urgent energy shortage. Moreover, with the improvement of human production capacities and the surge in demand for products, the extensive combustion of the traditional fuels has led to increasingly serious environmental pollution issues. The inherent intermittency and uncertainty of renewable energy have further intensified the pursuit of large-scale long-duration energy storage technologies. Redox flow batteries (RFBs) can store a large amount of energy in electrolytes, and have exceptional scalability, flexible modularization designs, and reliable safety. As a result, RFBs are an optimal solution for large-scale energy storage.

Researchers have extensively studied aqueous redox flow batteries (ARFBs) with water-soluble transition-metal ions as redox-active species. However, these ARFBs are still faced with persistent challenges. Although vanadium redox flow batteries have been commercialized due to high power density and long cycle life, the extensive application of vanadium redox flow batteries is constrained by the high cost of vanadium. To solve the above problem, researchers have actively pursued the development of low-cost and stable water-soluble organic compounds for AORFBs, including quinones, viologens, nitroxide radicals (such as 2,2,6,6-tetramethylpiperidin-1-oxyl (TEMPO)), phenazines, and ferrocene. Compared to inorganic systems, AORFBs show great application potentials: (1) The organic molecules, as active substances, are extensively available, cost-effective, and eco-friendly, and can be synthesized in batches. (2) The organic molecules have diversified structures, resulting in adjustable physicochemical and electrochemical properties.

Phenazine has three fused aromatic rings and is insoluble in water. Phenazine compounds have received great attention due to low potentials and two-electron and two-proton reactions. The previous studies have generally focused on the performance improvement and the redox potential regulation for phenazine compounds through molecular design and synthesis engineering, and significant progresses have been achieved. However, there are still some problems: (1) The practical utilization efficiency of organic active molecules is low, particularly during charge/discharge cycles at large current densities. This is primarily because the previous molecular designs often pay more attention to enhancing the solubility and stability of phenazine active molecules and neglect the improvement of reaction kinetics, resulting in poor rate performance and low utilization efficiency. (2) Although a lot of efforts have been made to improve the stability of phenazine active molecules through molecular designs and some outcomes have been achieved, there is still a big gap between the stability of typical phenazine active molecules designed previously and the stability required in practical application. (3) The synthesis of some molecules involves harsh conditions (high temperature, high pressure, and hydrogen), a high synthesis cost (expensive raw materials and special catalysts), a complicated reaction (involving multi-step synthesis and separation), and a low yield, which greatly increase the actual cost. Consequently, these factors make the practical operation of phenazine compound-based AORFBs as representatives far from meeting the requirements of large-scale development.

Phenonaphthazine (benzo[a]hydroxyphenazine-7/8-carboxylic acid, BHPC) was proposed early as a phenazine active molecule, and exhibits excellent performance in alkaline flow batteries. Thus, BHPC is representative. There is limited potential for the further molecular modification of BHPC, but the reported utilization efficiency, rate performance, energy efficiency, and stability of BHPC still need to be improved greatly. Therefore, there is a need for further research on BHPC, and the performance of BHPC can be further improved through other means, so as to lay a foundation for the large-scale development of alkaline AORFBs.

SUMMARY

An objective of the present disclosure is to provide an ultra-high stability phenazine-based electrolyte for an alkaline AORFB, and a flow battery. A polyhydroxy cyclic supramolecule additive in the electrolyte can improve the reaction kinetics of a phenazine-based organic compound and enhance the utilization and stability. The electrolyte has the advantages of easy availability of raw materials, easy operations, and low cost, and can be used to produce alkaline AORFBs with small polarization, high capacity utilization efficiency, prominent rate performance, high energy efficiency, and excellent stability.

To achieve the above objective, the present disclosure adopts the following technical solutions:

An ultra-high stability phenazine-based electrolyte for an alkaline AORFB is provided, including a polyhydroxy cyclic supramolecule, a phenazine-based organic compound, and an alkaline aqueous solution.

Preferably, the polyhydroxy cyclic supramolecule is a cyclodextrin with a rigid polyhydroxy conical cavity structure that is hydrophobic internally and hydrophilic externally, or a derivative of the cyclodextrin.

Preferably, in the ultra-high stability phenazine-based electrolyte, a concentration ratio of the phenazine-based organic compound to the polyhydroxy cyclic supramolecule is 1:(0.1-0.5) and preferably 1:(0.1-0.4).

Preferably, the polyhydroxy cyclic supramolecule is α-cyclodextrin or a derivative of the α-cyclodextrin, and/or β-cyclodextrin or a derivative of the β-cyclodextrin, and/or γ-cyclodextrin or a derivative of the γ-cyclodextrin.

Preferably, in the ultra-high stability phenazine-based electrolyte, a concentration of the phenazine-based organic compound is 0.05 mol/L to 0.3 mol/L, and a concentration of the polyhydroxy cyclic supramolecule is 0.01 mol/L to 0.3 mol/L. A concentration of an alkaline electrolyte in the alkaline aqueous solution is 0.5 M to 2 M.

Preferably, the phenazine-based organic compound is one or more selected from the group consisting of BHPC, hydroxyphenazine (HP), aminophenazine (2-amino-3-hydroxyphenazine, AHP), and derivatives of the BHPC, the HP, or the AHP.

A flow battery including the ultra-high stability phenazine-based electrolyte described above is provided.

A method for improving a reaction rate of a phenazine-based alkaline AORFB is provided, including using the ultra-high stability phenazine-based electrolyte described above, where the concentration of the polyhydroxy cyclic supramolecule in the ultra-high stability phenazine-based electrolyte is controlled at 0.01 mol/L to 0.03 mol/L.

The present disclosure has the following advantages:

Cyclodextrins are a class of low-cost and high-stability natural macromolecules, and have a unique rigid polyhydroxy conical cavity structure that is hydrophobic internally and hydrophilic externally. In addition, cyclodextrins have a suitable pKa value, and can undergo multi-fold deprotonation in an alkaline solution. Cyclodextrins are redox-inert under alkaline water conditions. Furthermore, cyclodextrins have a strong ability to form hydrogen bonds with organic molecules to achieve host-guest complexation with a suitable cavity size. Therefore, cyclodextrins can significantly improve the reaction kinetics and stability of phenazines.

In contrast to the molecular design and synthesis engineering with huge cost and limitations, the present disclosure has the advantages of easy availability of raw materials, easy operations, and low cost through addition of a small amount of a cyclodextrin to a phenazine-based electrolyte for an alkaline AORFB. In addition, alkaline AORFBs constructed with the electrolyte can achieve small polarization, high capacity utilization efficiency (higher than 95%), prominent rate performance, high energy efficiency (EE>80% @100 mA cm$^{-2}$), and high stability (more than 80 days, capacity attenuation ratio: less than 0.02%/day), and is thus very competitive.

DETAILED DESCRIPTION OF THE EMBODIMENTS

Figure 1:
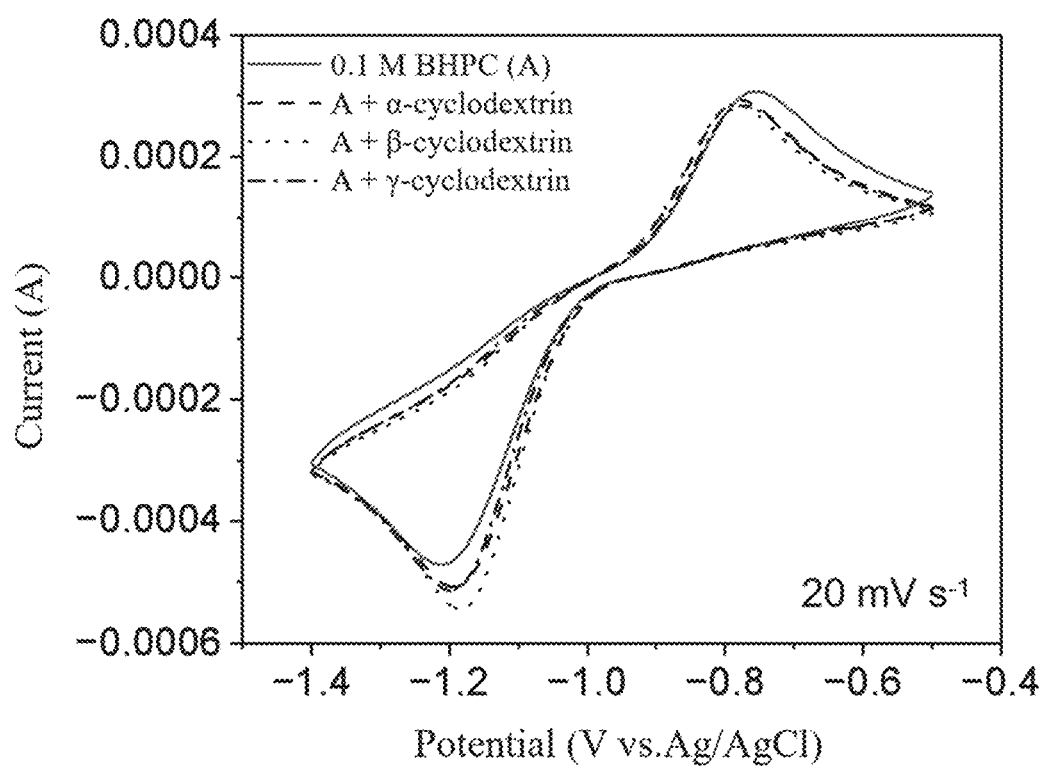
FIG. 1 shows cyclic voltammetry (CV) curves of phenazine-based electrolytes without/with different additives.

The present disclosure is specifically introduced below in conjunction with the accompanying drawings and embodiments.

(1) Synthesis of Simple Phenazines

With BHPC and a derivative thereof as an example, the BHPC and the derivative thereof were synthesized by a one-step method. 2-hydroxynaphthoquinone and a derivative thereof were subjected to a reaction with 3,4-diaminobenzoic acid and a derivative thereof in an acetic acid solution for 12 h to 24 h under reflux, respectively. The products were separated through filtration and oven-dried to produce the BHPC and the derivative thereof, respectively, which did not need to be further purified.

(2) Preparation of Phenazine-Based Electrolytes with Cyclodextrin Additives

A phenazine-based organic compound and a cyclodextrin were mixed in a specified ratio and dissolved with a KOH solution at a concentration of 1 M. The phenazine-based organic compound included, but was not limited to, BHPC and a derivative thereof. The cyclodextrin included, but was not limited to, α-cyclodextrin and a derivative thereof, β-cyclodextrin and a derivative thereof, and γ-cyclodextrin and a derivative thereof. A concentration ratio of the phenazine-based organic compound to the cyclodextrin was 1:0.1 to 1:3.

(3) Performance Tests for Phenazine-Based Electrolytes with Cyclodextrin Additives (3.1) Electrochemical Performance Test An electrochemical performance test was carried out with an electrochemical workstation (Chenhua CHI660E) and a standard three-electrode device. A glassy carbon electrode was used as a working electrode, a platinum electrode was used as a counter electrode, and a saturated Ag/AgCl electrode was used as a reference electrode. The oxidation-reduction properties of phenazine-based electrolytes without/with different additives were determined through cyclic voltammetry analysis. The oxidation-reduction properties of phenazine-based electrolytes with different additive contents were determined through cyclic voltammetry analysis.

(3.2) Tafel Kinetics Test

A Tafel kinetics test was carried out with an electrochemical workstation (Chenhua CHI660E) and a standard three-electrode device. A glassy carbon electrode was used as a working electrode, a platinum electrode was used as a counter electrode, and a saturated Ag/AgCl electrode was used as a reference electrode. The oxidation-reduction kinetics of phenazine-based electrolytes without/with different additives was determined by a Tafel test. The oxidation-reduction kinetics of phenazine-based electrolytes with different additive contents were determined by a Tafel test.

(4) Total-Battery Tests for Alkaline AORFBs Based on Phenazine-Based Electrolytes with Cyclodextrin Additives A battery performance test was carried out with a Xinwei constant-current battery testing system and a standard single flow battery module. A cation exchange membrane (including, but not limited to, a perfluorosulfonic acid membrane and a non-fluorinated membrane) was used as a separator. A reaction region was based on an area (4 cm$^2$) of a graphite felt electrode. In all battery tests of the present disclosure, a volume of a catholyte was 10.0 mL, a concentration of a phenazine-based organic compound was 0.1 mol L$^{-1}$, a concentration of a cyclodextrin additive was 0.01 mol L$^{-1}$ to 0.30 mol L$^{-1}$, a volume of an anolyte was 40.0 mL, and a concentration of potassium ferrocyanide was 0.1 mol L$^{-1}$. The electrolytes at the catholyte and the anolyte were circulated between a battery and a storage tank through a peristaltic pump (BT100-2J) at a flow rate of 100 mL min$^{-1}$.

(4.1) Rate Performance Test for Batteries

A constant-current charge/discharge rate test was conducted with a Xinwei constant-current battery testing system for a single battery at a current density of 40 mA cm$^{-2}$ to 120 mA cm$^{-2}$.

(4.2) Constant-Current Charge/Discharge Stability Test for Batteries

A constant-current charge/discharge test was conducted with a Xinwei constant-current battery testing system for a single battery at a current density of 100 mA cm$^{-2}$.

Performance Tests for Phenazine-Based Electrolytes with Cyclodextrin Additives

Electrochemical Performance Test

Cyclodextrins are redox-inert under alkaline water conditions. FIG. 1 shows CV curves of phenazine-based electrolytes without/with different additives (concentration ratio of BHPC to cyclodextrin=1:0.2). A CV curve of a phenazine-based electrolyte without a cyclodextrin additive is taken as a blank group. It can be seen that, after a cyclodextrin is added, the polarization of a CV curve decreases significantly and an intensity of a reduction peak increases significantly, which is the most significant when β-cyclodextrin is added as an additive. These results indicate that the addition of a cyclodextrin is conducive to increasing a current intensity of a phenazine-based electrolyte and reducing the polarization. This is mainly attributed to the following fact: A cyclodextrin has a strong ability to form a hydrogen bond with an organic molecule, and thus can effectively inhibit a hydrogen evolution side reaction of a water solvent, thereby improving a redox ability of the organic molecule itself.

Figure 2:
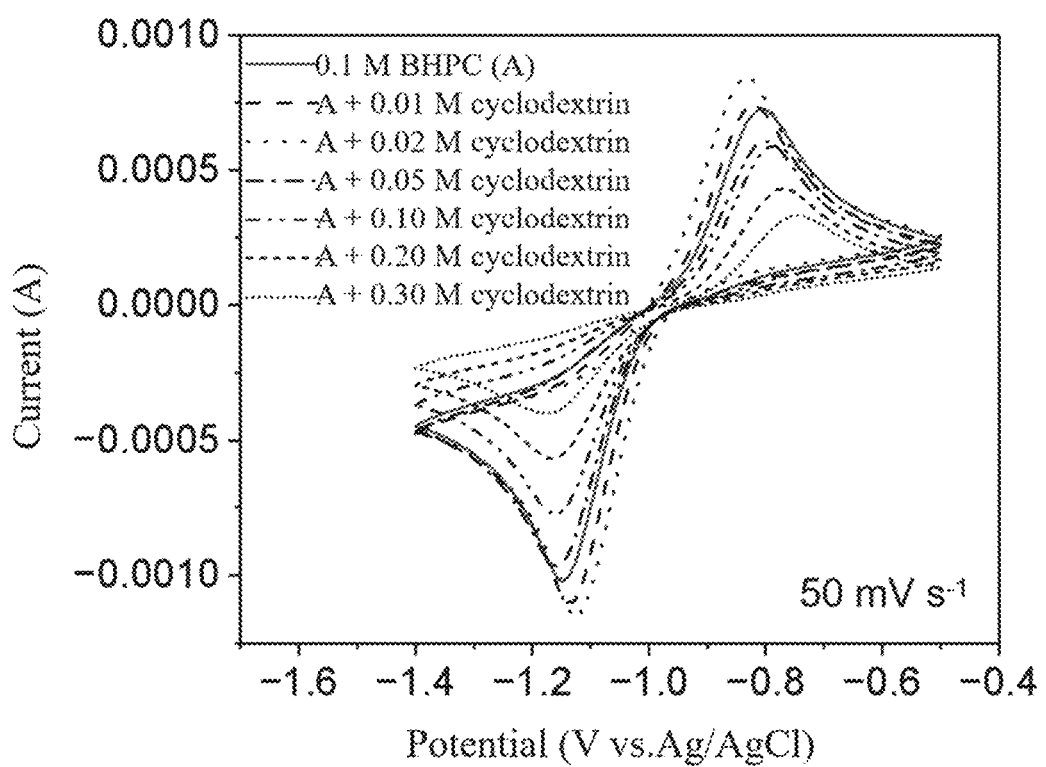
FIG. 2 shows CV curves of phenazine-based electrolytes with different additive contents.

FIG. 2 shows CV curves of phenazine-based electrolytes with different additive contents. It can be seen from FIG. 2 that, with the increasing proportion of β-cyclodextrin, the polarization of a CV curve decreases first and then increases, and an intensity of a reduction peak increases first and then decreases. These results indicate that the optimal concentration ratio for the electrolyte is as follows: phenazine:cyclodextrin=1:0.2. This is mainly attributed to the fact that the cyclodextrin has a strong ability to form a hydrogen bond with an organic molecule. Thus, the cyclodextrin at an appropriate concentration can effectively inhibit a hydrogen evolution side reaction of a water solvent, thereby improving a redox ability of the organic molecule itself. However, the further increase of the cyclodextrin concentration will increase a viscosity and decrease an electrical conductivity for an electrolyte, which leads to the increase in polarization and the decrease in a redox current for the electrolyte.

Tafel Kinetics Test

Figure 3:
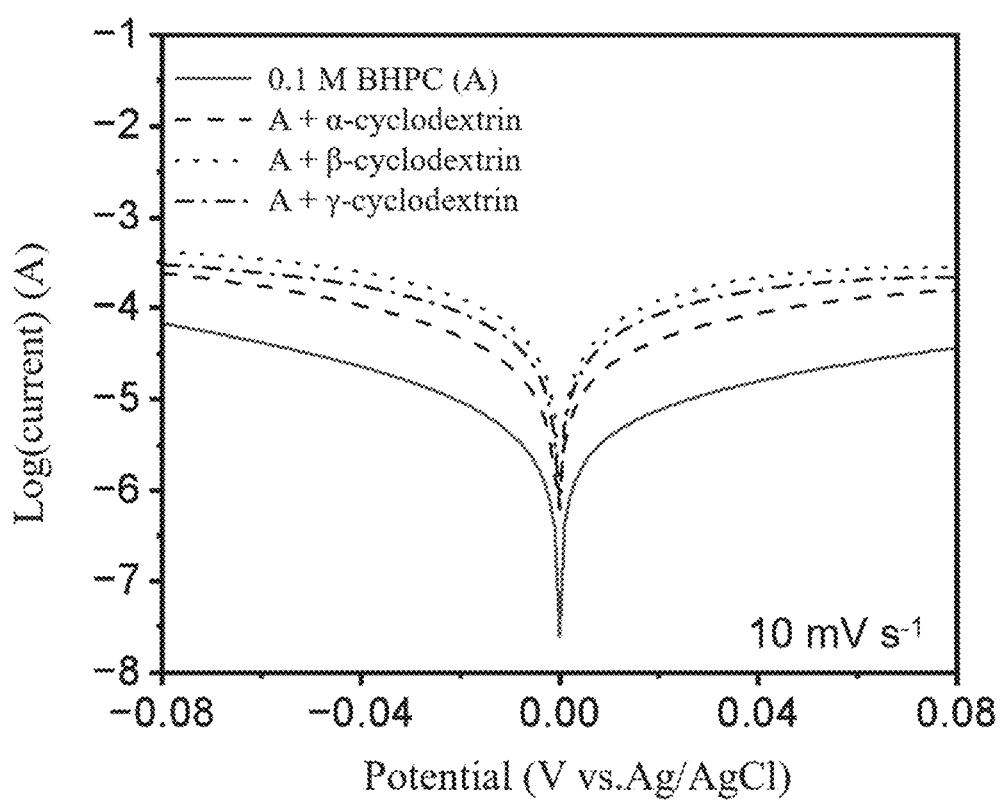
FIG. 3 shows Tafel curves of phenazine-based electrolytes without/with different additives.

FIG. 3 shows Tafel curves of phenazine-based electrolytes without/with different additives. A Tafel curve of a phenazine-based electrolyte without a cyclodextrin additive is taken as a blank group. It can be seen that, after a cyclodextrin (concentration ratio of BHPC to cyclodextrin=1:0.2) is added, an exchange current density of a Tafel curve is significantly enhanced, which is the most significant when β-cyclodextrin is added as an additive. These results indicate that the addition of a cyclodextrin is conducive to increasing the reaction kinetics of a phenazine-based electrolyte. This is mainly attributed to the following fact: Cyclodextrins have a suitable pKa value, and can undergo multi-fold deprotonation in an alkaline solution. The proton regulation strategy contributes to accelerating an electrochemical redox process of an organic molecule.

Figure 4:
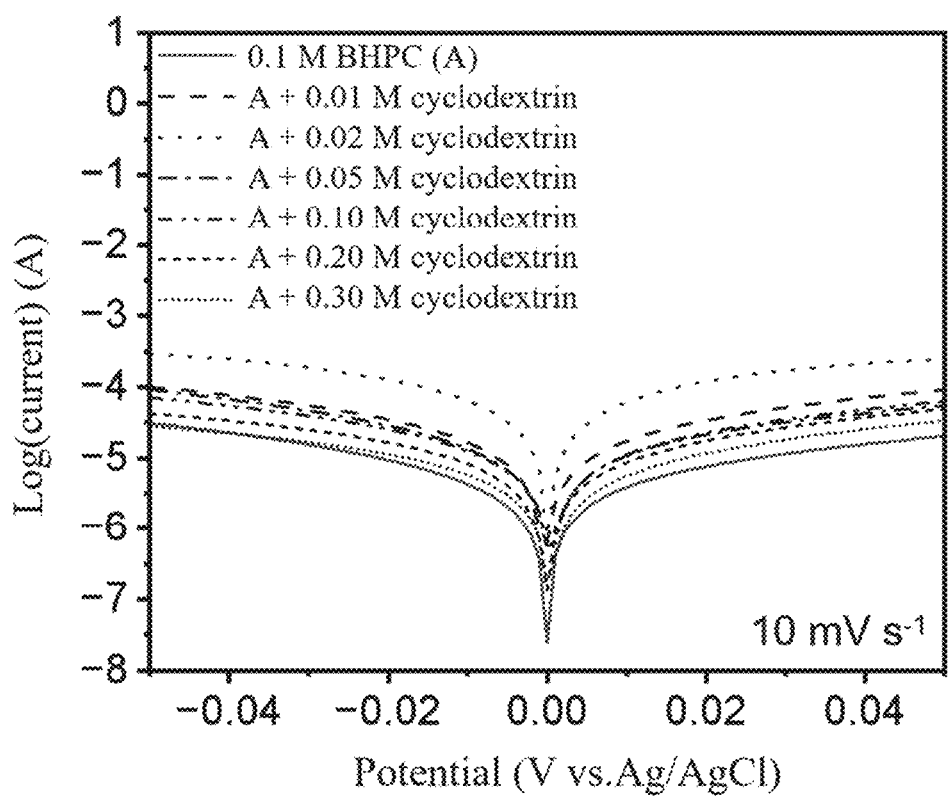
FIG. 4 shows Tafel curves of phenazine-based electrolytes with different additive contents.
Figure 5:
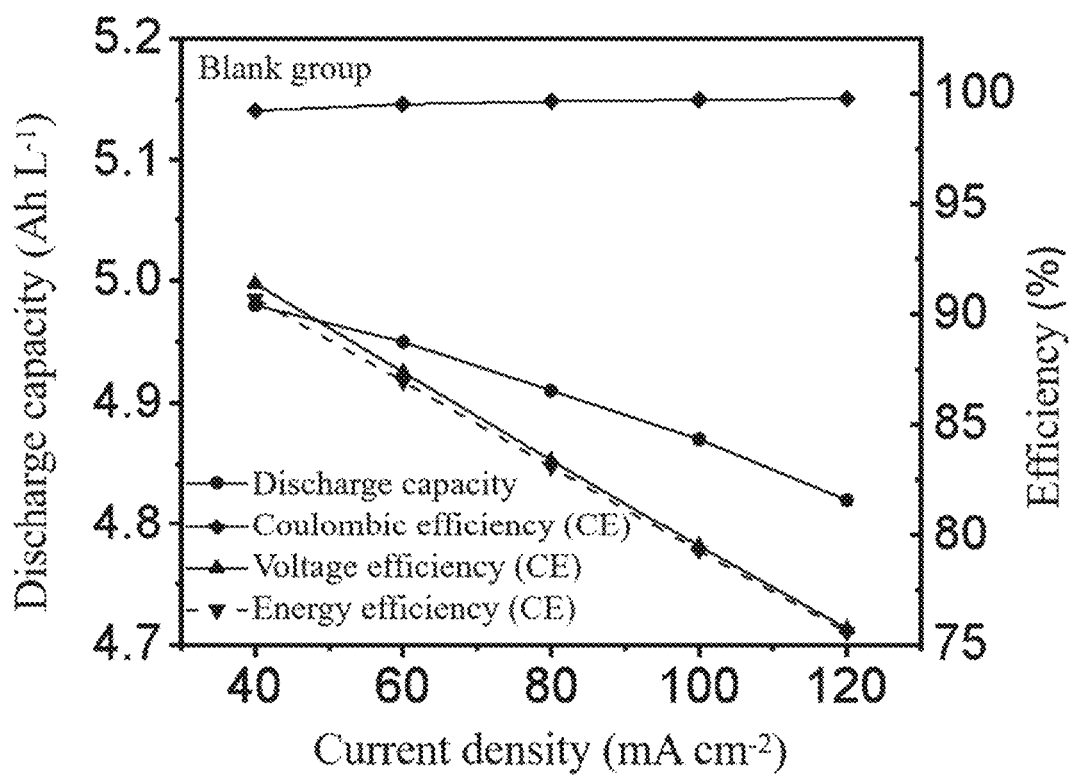
FIG. 5 shows rate performance of a battery prepared with a phenazine-based electrolyte without an additive, including discharge capacities, coulombic efficiencies, voltage efficiencies, and energy efficiencies at different current densities.
Figure 6:
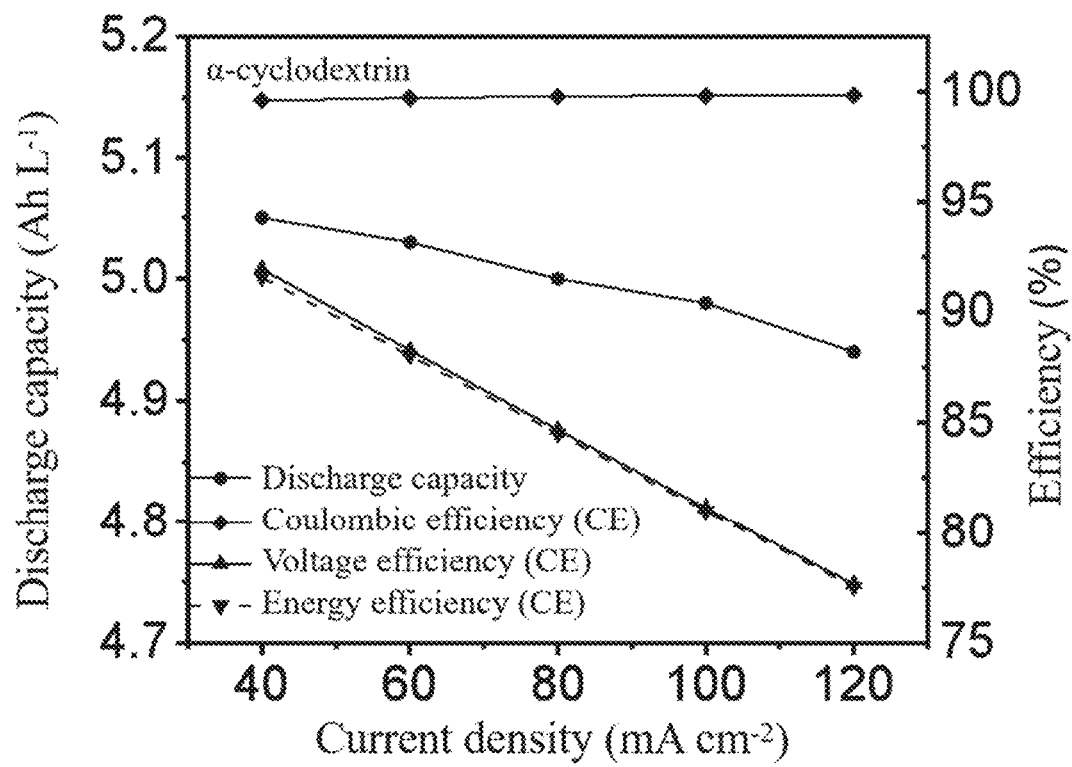
FIG. 6 shows rate performance of a battery prepared with a phenazine-based electrolyte with an α-cyclodextrin additive, including discharge capacities, coulombic efficiencies, voltage efficiencies, and energy efficiencies at different current densities.
Figure 7:
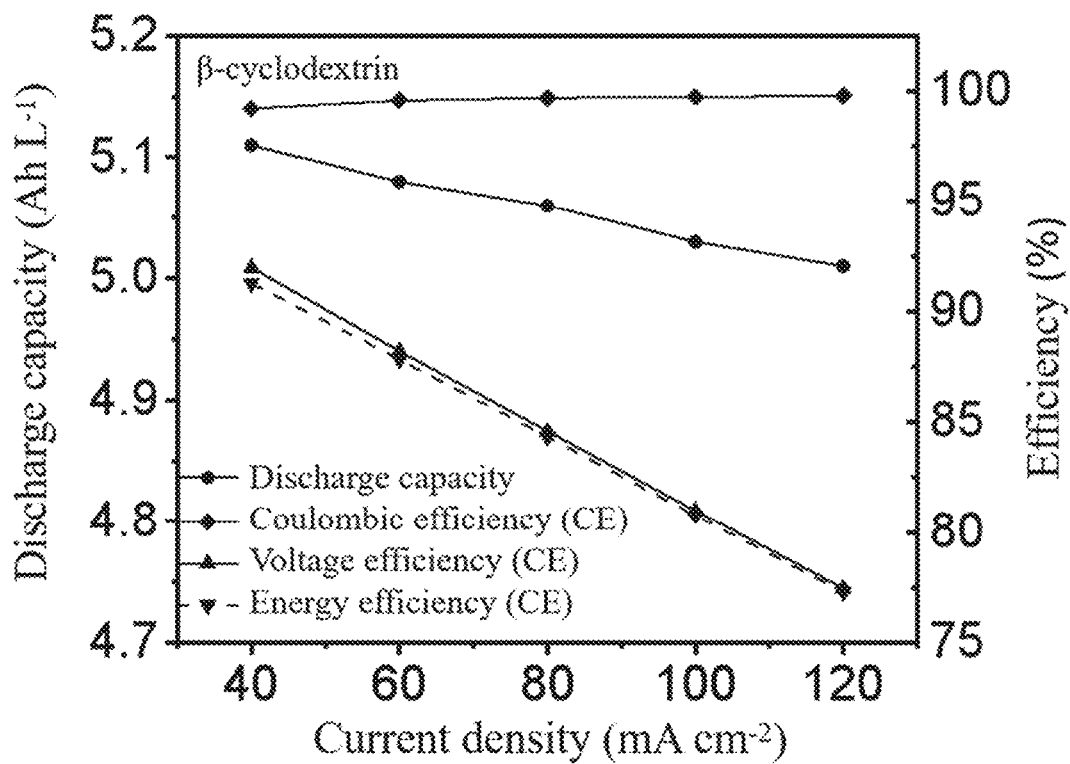
FIG. 7 shows rate performance of a battery prepared with a phenazine-based electrolyte with a β-cyclodextrin additive, including discharge capacities, coulombic efficiencies, voltage efficiencies, and energy efficiencies at different current densities.
Figure 8:
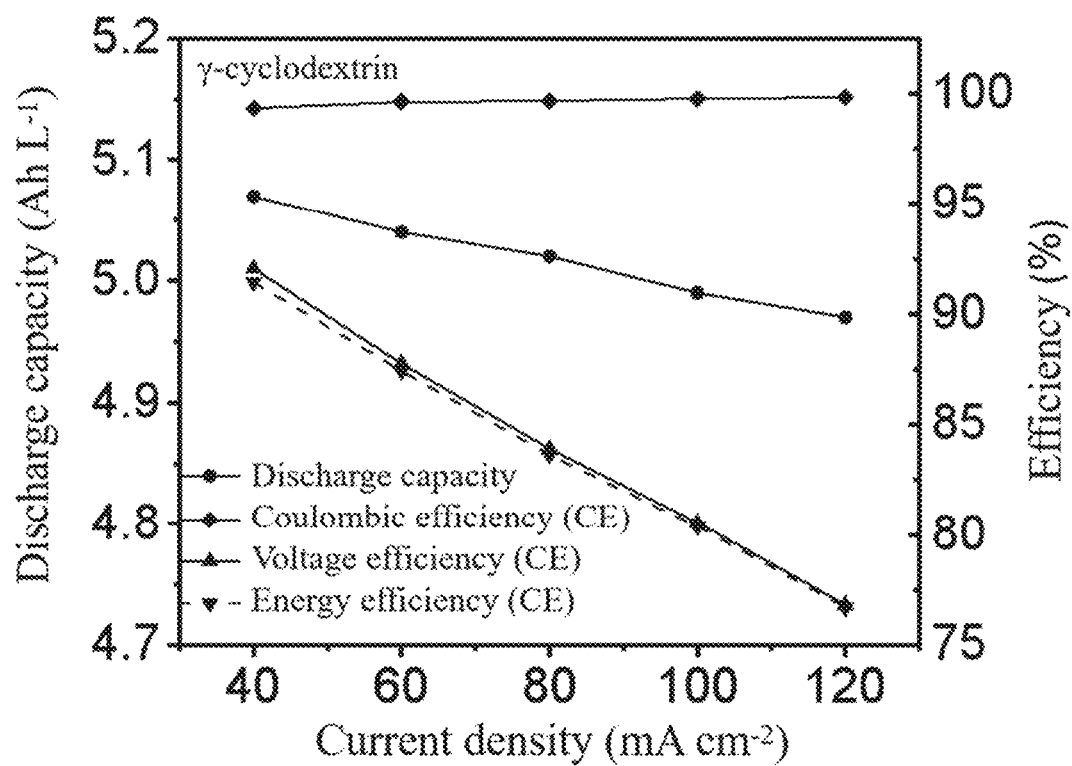
FIG. 8 shows rate performance of a battery prepared with a phenazine-based electrolyte with a γ-cyclodextrin additive, including discharge capacities, coulombic efficiencies, voltage efficiencies, and energy efficiencies at different current densities.

FIG. 4 shows Tafel curves of phenazine-based electrolytes with different additive contents. It can be seen from FIG. 4 that, with the increasing proportion of β-cyclodextrin, an exchange current density of a Tafel curve increases first and then decreases, but is still greater than an exchange current density of a phenazine-based electrolyte without a cyclodextrin. These results further indicate that the cyclodextrin is conducive to increasing the reaction kinetics of a phenazine-based electrolyte. The optimal concentration ratio for the electrolyte is as follows: phenazine:cyclodextrin=1:0.2. This is mainly because the cyclodextrin at an appropriate concentration can effectively improve the reaction kinetics of an organic molecule. However, the further increase of a cyclodextrin concentration will increase a viscosity and decrease an electrical conductivity for an electrolyte, which weakens the improvement for reaction kinetics of organic molecules to some extent.

Total-Battery Tests for Alkaline AORFBs Based on Phenazine-Based Electrolytes with Cyclodextrin Additives Rate Performance Test for Batteries FIG. 5, FIG. 6, FIG. 7, and FIG. 8 show the rate performance of batteries prepared with phenazine-based electrolytes without/with different additives at different current densities. Table 1 shows the comparison results of capacity utilization efficiencies of different phenazine-based electrolytes at different current densities and the comparison results of capacity utilization efficiencies of phenazine-based electrolytes without/with different additives at different current densities. According to the comparison of capacity utilization efficiencies of a plurality of phenazine-based organic flow batteries at different current densities, it can be obviously known that BHPC has a high capacity utilization efficiency and prominent rate performance. Therefore, BHPC is selected as a representative of phenazine-based alkaline organic flow batteries for further research. According to the variable current tests for phenazine-based organic flow batteries without/with different additives, the introduction of a cyclodextrin can improve the capacity utilization efficiency and energy efficiency for a battery (higher than 80% @100 mA cm$^{-2}$). This is because the introduction of a cyclodextrin additive accelerates the redox kinetics of an organic active molecule and reduces the polarization, which increase the capacity utilization efficiency of the organic active molecule and the energy efficiency of the battery.

TABLE 1

Comparison results of capacity utilization efficiencies of different phenazine-based electrolytes at different current densities and comparison results of capacity utilization efficiencies of phenazine-based electrolytes without/with different additives at different current densities

| Example | Organic matter | Additive | Capacity utilization efficiency@ 40 mA cm$^{-2}$ | Capacity utilization efficiency@ 60 mA cm$^{-2}$ | Capacity utilization efficiency@ 80 mA cm$^{-2}$ | Capacity utilization efficiency@ 100 mA cm$^{-2}$ | Capacity utilization efficiency@ 120 mA cm$^{-2}$ |
|---|---|---|---|---|---|---|---|
| Reference 1 | BHPS | No additive | 90.49% | 88.62% | 83.02% | 75.56% | — |
| Reference 2 | DBEP | No additive | 89.00% | 85.00% | 80.00% | 75.00% | — |
| Reference 3 | DPAP | No additive | 91.00% | 86.00% | 80.00% | 50.00% | — |
| Example 1 | BHPC | No additive | 92.91% | 92.35% | 91.60% | 90.86% | 89.93% |
| Example 2 | BHPC | α-Cyclodextrin | 94.21% | 93.84% | 93.28% | 92.91% | 92.16% |
| Example 3 | BHPC | β-Cyclodextrin | 95.34% | 94.78% | 94.40% | 93.84% | 93.28% |
| Example 4 | BHPC | γ-Cyclodextrin | 94.59% | 94.03% | 93.65% | 93.10% | 92.72% |

Constant-Current Charge/Discharge Stability Test for Batteries

Figure 9:
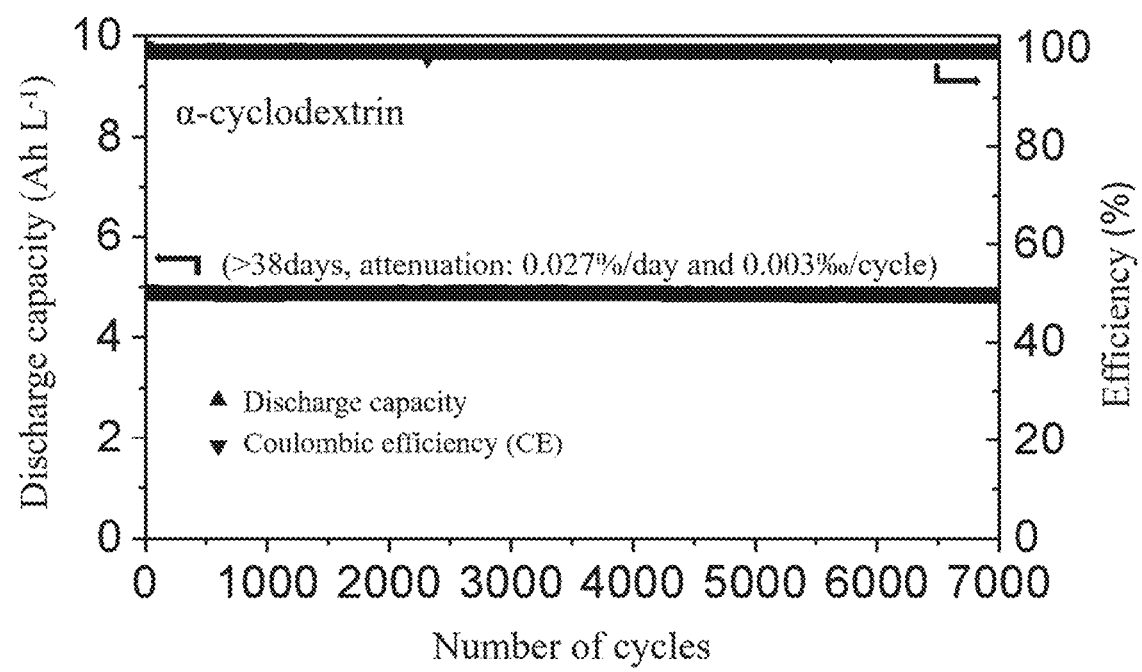
FIG. 9 shows results of a stability test (@100 mA cm$^{-2}$) for a battery prepared with a phenazine-based electrolyte with an α-cyclodextrin additive, where attenuation: 0.013%/day and 0.0014% o/cycle.
Figure 10:
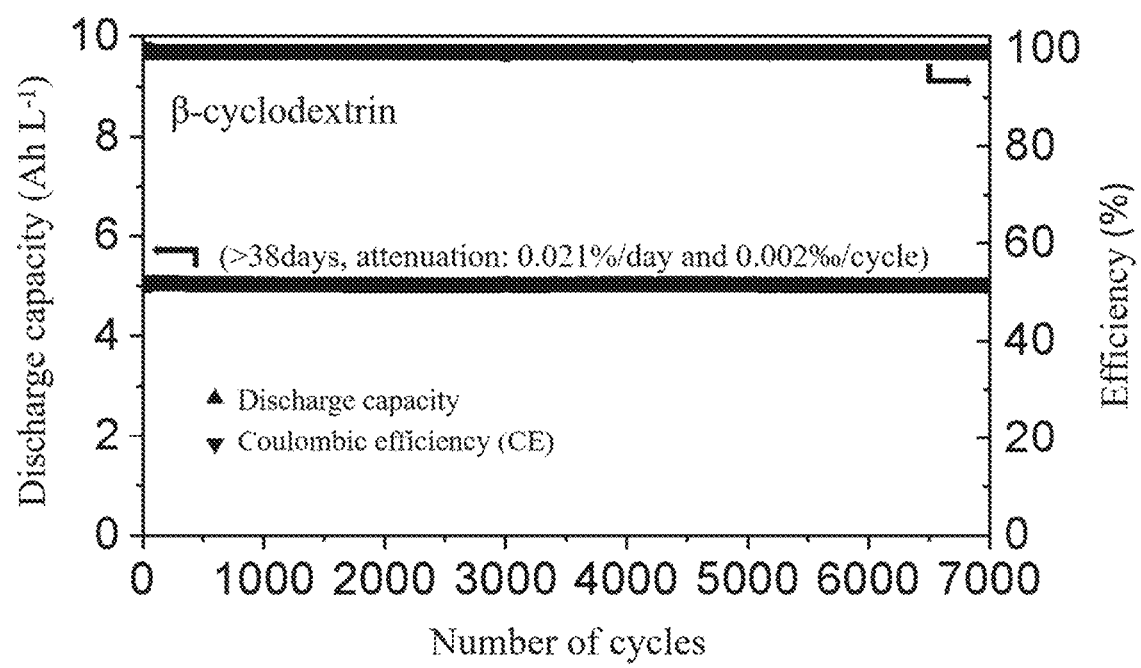
FIG. 10 shows results of a stability test (@100 mA cm$^{-2}$) for a battery prepared with a phenazine-based electrolyte with a β-cyclodextrin additive, where attenuation: 0.011%/day and 0.0010% o/cycle.
Figure 11:
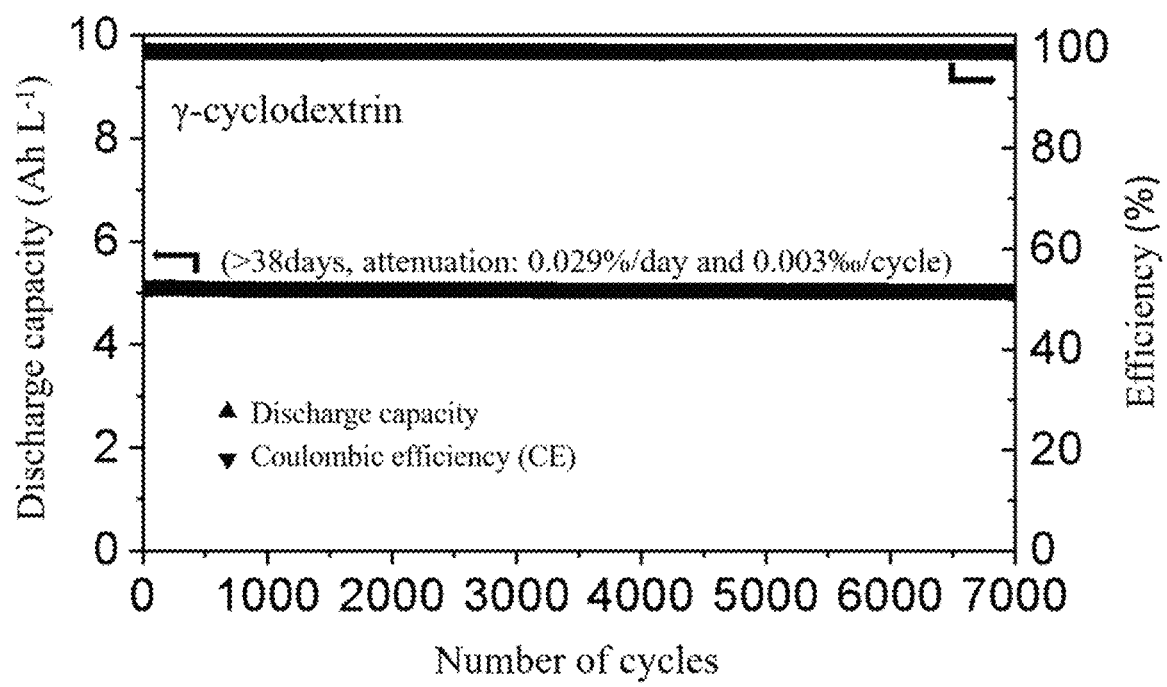
FIG. 11 shows results of a stability test (@100 mA cm$^{-2}$) for a battery prepared with a phenazine-based electrolyte with a γ-cyclodextrin additive, where attenuation: 0.014%/day and 0.0015% o/cycle.

FIG. 9, FIG. 10, and FIG. 11 show the long-term performance of batteries prepared with phenazine-based electrolytes with different additives at a current densities of 100 mA cm$^{-2}$. Table 2 shows the comparison results of energy efficiencies and capacity retention rates of different phenazine-based alkaline organic flow batteries at a current density of 100 mA cm$^{-2}$ and the comparison results of energy efficiencies and capacity retention rates of phenazine-based alkaline organic flow batteries without/with different additives at a current density of 100 mA cm$^{-2}$. It can be obviously seen that BHPC exhibits the optimal energy density and capacity retention rate at the current density of 100 mA cm$^{-2}$. As a result, BHPC is selected as a representative of phenazine-based alkaline organic flow batteries for further research. Test results further show that, after a cyclodextrin is added to a phenazine-based alkaline organic flow battery, the energy density and stability both are significantly improved. This is mainly because a dense hydrogen bonding network and the host-guest complexation are formed between a cyclodextrin and an organic active molecule, which can effectively stabilize the organic active molecules in oxidized and reduced states to significantly improve the stability of a battery.

TABLE 2

Comparison results of energy efficiencies and capacity retention rates of different phenazine-based alkaline organic flow batteries at a current density of 100 mA cm$^{-2}$ and comparison results of energy efficiencies and capacity retention rates of phenazine-based alkaline organic flow batteries without/with different additives at a current density of 100 mA cm$^{-2}$

| Example | Anolyte | Catholyte | Additive | Current density | Energy efficiency | Capacity retention rate |
|---|---|---|---|---|---|---|
| Reference 1 | Potassium ferricyanide/potassium ferrocyanide | BHPS | None | 100 mA cm$^{-2}$ | 62.50% | 99.25 @100 cycles |
| Reference 2 | Potassium ferricyanide/potassium ferrocyanide | DBEP | None | 100 mA cm$^{-2}$ | 75.00% | 97.80% @1,024 cycles |
| Reference 3 | Potassium ferricyanide/potassium ferrocyanide | DPAP | None | 100 mA cm$^{-2}$ | 45.00% | 99.70% @192 cycles |
| Reference 4 | Potassium ferricyanide/potassium ferrocyanide | DHPS | None | 100 mA cm$^{-2}$ | 75.00% | 90.00% @500 cycles |
| Example 1 | Potassium ferricyanide/potassium ferrocyanide | BHPC | None | 100 mA cm$^{-2}$ | 78.90% | 95.59% @3,000 cycles |
| Example 2 | Potassium ferricyanide/potassium ferrocyanide | BHPC | 0.02M α-cyclodextrin | 100 mA cm$^{-2}$ | 80.90% | 99.02% @7,000 cycles |
| Example 3 | Potassium ferricyanide/potassium ferrocyanide | BHPC | 0.02M β-cyclodextrin | 100 mA cm$^{-2}$ | 81.05% | 99.30% @7,000 cycles |

TABLE 2-continued

Comparison results of energy efficiencies and capacity retention rates of different phenazine-based alkaline organic flow batteries at a current density of 100 mA cm$^{-2}$ and comparison results of energy efficiencies and capacity retention rates of phenazine-based alkaline organic flow batteries without/with different additives at a current density of 100 mA cm$^{-2}$

| Example | Anolyte | Catholyte | Additive | Current density | Energy efficiency | Capacity retention rate |
|---|---|---|---|---|---|---|
| Example 4 | Potassium ferricyanide/ potassium ferrocyanide | BHPC | 0.02M γ-cyclodextrin | 100 mA cm$^{-2}$ | 80.53% | 98.95% @7,000 cycles |

REFERENCES

[1] Park, J., Lee, Y., Yun, D. et al. A benzo[a]phenazine-based redox species with highly reversible two-electron reaction for aqueous organic redox flow batteries. Electrochim. Acta, 2023,439,141644;
[2] Liu, Y., Zhang P., Wu Z. et al. Screening Ultra-Stable (Phenazine) dioxyalkanocic Acids with Varied Water-Solubilizing Chain Lengths for High-Capacity Aqueous Redox Flow Batteries. J. Am. Chem. Soc., 2024, 146, 3293-3302;
[3] Pang, S., Wang, X., Wang, P. et al. Biomimetic Amino Acid Functionalized Phenazine Flow Batteries with Long Lifetime at Near-Neutral pH. Angew. Chem. Int. Ed. 2021, 60, 5289-5298;
[4] Hollas, A., Wei, X., Murugesan, V. et al. A biomimetic high-capacity phenazine-based anolyte for aqueous organic redox flow batteries. Nat Energy, 2018, 3, 508-514.

The above are merely preferred implementations of the present application. It should be noted that a person of ordinary skill in the art may further make several improvements and modifications without departing from the principle of the present application, but such improvements and modifications should be deemed as falling within the protection scope of the present application.

The invention claimed is:

1. An ultra-high stability phenazine-based electrolyte for an alkaline aqueous organic redox flow battery, comprising a polyhydroxy cyclic supramolecule, a phenazine-based organic compound, and an alkaline aqueous solution,
wherein the polyhydroxy cyclic supramolecule is a cyclodextrin or a derivative of the cyclodextrin; and
in the ultra-high stability phenazine-based electrolyte, a concentration of the phenazine-based organic compound is 0.05 mol/L to 0.3 mol/L, a concentration of the polyhydroxy cyclic supramolecule is 0.01 mol/L to 0.1 mol/L, and a concentration ratio of the phenazine-based organic compound to the polyhydroxy cyclic supramolecule is 1:(0.1-0.5).

2. The ultra-high stability phenazine-based electrolyte for the alkaline aqueous organic redox flow battery according to claim 1, wherein the concentration ratio of the phenazine-based organic compound to the polyhydroxy cyclic supramolecule is 1:(0.1-0.4).

3. The ultra-high stability phenazine-based electrolyte for the alkaline aqueous organic redox flow battery according to claim 1, wherein the polyhydroxy cyclic supramolecule is at least one of:

α-cyclodextrin or a derivative of the α-cyclodextrin, β-cyclodextrin or a derivative of the β-cyclodextrin, or γ-cyclodextrin or a derivative of the γ-cyclodextrin.

4. The ultra-high stability phenazine-based electrolyte for the alkaline aqueous organic redox flow battery according to claim 1, wherein the phenazine-based organic compound is one or more selected from the group consisting of phenonaphthazine, hydroxyphenazine, aminophenazine, and derivatives of the phenonaphthazine, the hydroxyphenazine, or the aminophenazine.

5. A flow battery comprising the ultra-high stability phenazine-based electrolyte according to claim 1.

6. A method for improving reaction kinetics of a phenazine-based alkaline aqueous organic redox flow battery, comprising using the ultra-high stability phenazine-based electrolyte according to claim 1, wherein the concentration of the polyhydroxy cyclic supramolecule in the ultra-high stability phenazine-based electrolyte is controlled at 0.01 mol/L to 0.03 mol/L; and the reaction kinetics is measured by an exchange current density in a Tafel curve.

7. A method for improving reaction kinetics of a phenazine-based alkaline aqueous organic redox flow battery, comprising using the ultra-high stability phenazine-based electrolyte according to claim 2, wherein the concentration of the polyhydroxy cyclic supramolecule in the ultra-high stability phenazine-based electrolyte is controlled at 0.01 mol/L to 0.03 mol/L; and the reaction kinetics is measured by an exchange current density in a Tafel curve.

8. A method for improving reaction kinetics of a phenazine-based alkaline aqueous organic redox flow battery, comprising using the ultra-high stability phenazine-based electrolyte according to claim 3, wherein the concentration of the polyhydroxy cyclic supramolecule in the ultra-high stability phenazine-based electrolyte is controlled at 0.01 mol/L to 0.03 mol/L; and the reaction kinetics is measured by an exchange current density in a Tafel curve.

9. A method for improving reaction kinetics of a phenazine-based alkaline aqueous organic redox flow battery, comprising using the ultra-high stability phenazine-based electrolyte according to claim 4, wherein the concentration of the polyhydroxy cyclic supramolecule in the ultra-high stability phenazine-based electrolyte is controlled at 0.01 mol/L to 0.03 mol/L; and the reaction kinetics is measured by an exchange current density in a Tafel curve.

10. A flow battery comprising the ultra-high stability phenazine-based electrolyte according to claim 2.

11. A flow battery comprising the ultra-high stability phenazine-based electrolyte according to claim 3.

12. A flow battery comprising the ultra-high stability phenazine-based electrolyte according to claim 4.

* * * * *